Patented Nov. 6, 1928.

1,690,869

UNITED STATES PATENT OFFICE.

FREDERICK MARTINEZ AND ADOLFO GÓMEZ, OF NEW YORK, N. Y.

HÆMOSTATIC.

No Drawing. Application filed August 10, 1926. Serial No. 128,516.

The present invention relates to a medicinal compound or preparation which exhibits the properties of a hæmostatic. Applicants' compound has been found to be particularly effective in the treatment of uterine hemorrhages. One method of making the preparation according to our invention consists in subjecting the fibres of the outside part of the fruit of the *Cocos nucifera* to the action of boiling water and maintaining the boiling temperature thereof for sufficient time to effectively liberate the remedially active content thereof. For example good results are obtained in the use of our preparation when made by boiling two ounces of the fibres of the outside of the fruit of the *Cocos nucifera* in twenty ounces of water for about one hour and thereafter filtering the solution. However, we do not limit ourselves to this particular manner of obtaining the desired extract or active content, inasmuch as other equally effective methods will readily occur to those skilled in the art. Favorable results are observed in connection with the use of the compound above described where a tablespoonful is added to approximately ¼ of a tumblerful of water and administered every 3 hours until the symptoms of hemorrhage disappear. This is frequently brought about within a period of 24 hours of treatment.

What we claim is:

1. A medicinal preparation comprising the medicinally active content of the fibres of the outside of the fruit of the *Cocos nucifera*.

2. A medicinal preparation comprising an extract of the fibres of the outside of the fruit of the *Cocos nucifera*.

3. A medicinal preparation consisting of a solution of the extract from one part of the fibres of the outside of the fruit of the *Cocos nucifera* in ten parts of water.

4. A medicinal preparation consisting of a solution containing extract from the fibres of the outside of the fruit of the *Cocos nucifera*.

5. A medicinal preparation consisting of a solution containing an aqueous extract of the fibers of the outside of the fruit of the *Cocos nucifera*.

6. A hæmostatic comprising an aqueous extract of the fibers of the outside of the fruit of the *Cocos nucifera*.

In testimony whereof, we have signed our names to this specification this 2nd day of August, 1926.

FREDERICK MARTINEZ.
ADOLFO GÓMEZ.